US012493910B2

(12) United States Patent
Datta et al.

(10) Patent No.: US 12,493,910 B2
(45) Date of Patent: Dec. 9, 2025

(54) APPARATUS AND METHOD FOR CONFIGURING SUBMISSION OF FINANCIAL FORECASTING DATA

(71) Applicant: Rakuten Symphony, Inc., Tokyo (JP)

(72) Inventors: Anindita Datta, Tokyo (JP); Asfak Khan, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/011,000

(22) PCT Filed: Oct. 18, 2022

(86) PCT No.: PCT/US2022/046968
§ 371 (c)(1),
(2) Date: Dec. 16, 2022

(87) PCT Pub. No.: WO2024/085861
PCT Pub. Date: Apr. 25, 2024

(65) Prior Publication Data
US 2024/0233026 A1    Jul. 11, 2024

(51) Int. Cl.
*G06Q 40/06* (2012.01)
(52) U.S. Cl.
CPC .................... *G06Q 40/06* (2013.01)
(58) Field of Classification Search
CPC ........................................ G06Q 40/00
USPC ............................................. 705/35
See application file for complete search history.

(56) References Cited

U.S. PATENT DOCUMENTS 5,659,593 A * 8/1997 Tzvieli .................... H04M 3/36
379/112.01
6,012,035 A * 1/2000 Freeman, Jr. ........ G06Q 20/105
705/40
6,324,516 B1 * 11/2001 Shults .................... G06Q 10/10
705/2

(Continued)

OTHER PUBLICATIONS

International Search Report on Patentability dated Jan. 31, 2023 in Application No. PCT/US22/46968.

(Continued)

*Primary Examiner* — Kirsten S Apple
(74) *Attorney, Agent, or Firm* — Sughrue Mion, PLLC

(57) ABSTRACT

An apparatus for configuring submission of financial forecasting data. The apparatus includes: a memory storing instructions; a processor configured to execute the stored instructions to implement operations. The operations include: controlling a user interface to be displayed and controlling receiving and storing of submitted financial forecasting data. The operations include controlling receiving and storing of a freeze time, which indicates a time after which financial forecasting data, which was already submitted before the freeze time, cannot be modified by users. The operations include controlling receiving and storing of submission period configuration data, which configures multiple submission periods that will occur before the freeze time, and wherein the submission periods are periods during which financial forecasting data may be submitted and periods outside of which submission of financial forecasting data is restricted. Finally, the operations include controlling generating a financial forecast using the stored submitted financial forecasting data.

20 Claims, 26 Drawing Sheets

(56) References Cited

U.S. PATENT DOCUMENTS

| | | | | | |
|---|---|---|---|---|---|
| 6,611,726 | B1* | 8/2003 | Crosswhite | G06Q 10/087 | 705/28 |
| 6,826,536 | B1* | 11/2004 | Forman | G06Q 10/10 | 705/3 |
| 6,934,692 | B1* | 8/2005 | Duncan | G06Q 30/06 | 705/26.25 |
| 7,340,401 | B1* | 3/2008 | Koenig | G06Q 40/08 | 600/300 |
| 7,356,516 | B2* | 4/2008 | Richey | G06Q 30/0253 | 705/16 |
| 7,395,219 | B2* | 7/2008 | Strech | G06Q 40/00 | 705/4 |
| 7,467,094 | B2* | 12/2008 | Rosenfeld | G06Q 30/04 | 340/539.18 |
| 7,657,441 | B2* | 2/2010 | Richey | G06Q 20/403 | 705/30 |
| 8,527,292 | B1* | 9/2013 | Ozden | G16H 70/60 | 705/30 |
| 2002/0077867 | A1* | 6/2002 | Gittins | G06Q 40/08 | 705/4 |
| 2003/0130873 | A1* | 7/2003 | Nevin | G16H 50/20 | 705/3 |
| 2003/0225690 | A1* | 12/2003 | Eaton | G06Q 30/04 | 705/40 |
| 2003/0233292 | A1* | 12/2003 | Richey | G06Q 40/12 | 705/28 |
| 2004/0153382 | A1* | 8/2004 | Boccuzzi | H04M 15/73 | 705/34 |
| 2004/0215538 | A1* | 10/2004 | Smith | G06Q 40/00 | 705/37 |
| 2005/0055305 | A1* | 3/2005 | Lutnick | G06Q 40/04 | 705/37 |
| 2006/0085246 | A1* | 4/2006 | Li | G06Q 30/0202 | 705/7.31 |
| 2007/0007335 | A1* | 1/2007 | Cracchiolo | G06Q 40/00 | 235/380 |
| 2007/0011025 | A1* | 1/2007 | Cracchiolo | G06Q 30/04 | 705/2 |
| 2007/0011088 | A1* | 1/2007 | Cracchiolo | G06Q 20/10 | 705/2 |
| 2007/0185803 | A1* | 8/2007 | Harrison | G06Q 20/387 | 705/36 T |
| 2007/0194108 | A1* | 8/2007 | Kalappa | G06Q 40/00 | 235/381 |
| 2007/0194109 | A1* | 8/2007 | Harrison | G06Q 20/227 | 235/381 |
| 2007/0208594 | A1* | 9/2007 | Yang | G06Q 20/102 | 705/40 |
| 2007/0294115 | A1* | 12/2007 | Loeb | G06Q 40/08 | 705/4 |
| 2008/0059351 | A1* | 3/2008 | Richey | G06Q 20/20 | 705/35 |
| 2008/0109263 | A1* | 5/2008 | Clark | G06Q 30/0216 | 705/14.18 |
| 2009/0119224 | A1* | 5/2009 | Petrino | G06Q 40/04 | 705/37 |
| 2009/0144082 | A1* | 6/2009 | Selbst | G06Q 40/02 | 705/2 |
| 2010/0070409 | A1* | 3/2010 | Harrison | G06Q 20/10 | 705/39 |
| 2010/0082405 | A1* | 4/2010 | Shan | G06Q 30/0202 | 705/7.31 |
| 2010/0138360 | A1* | 6/2010 | Cutler | G06Q 40/04 | 715/764 |
| 2012/0072241 | A1* | 3/2012 | Krause | G06Q 40/02 | 705/4 |
| 2012/0185275 | A1* | 7/2012 | Loghmani | G06Q 40/08 | 705/3 |
| 2014/0101018 | A1* | 4/2014 | Buck | G06Q 40/04 | 705/37 |
| 2015/0235318 | A1* | 8/2015 | Huan | G06Q 40/04 | 705/37 |
| 2016/0057125 | A1* | 2/2016 | Li | H04L 9/40 | 713/168 |
| 2016/0063631 | A1* | 3/2016 | Wootton | G06Q 40/06 | 705/36 R |
| 2016/0132644 | A1* | 5/2016 | Kido | G06Q 30/0207 | 705/3 |
| 2016/0140658 | A1* | 5/2016 | Kelly | G06Q 40/04 | 705/37 |
| 2019/0324652 | A1* | 10/2019 | Vishwakarma | G06F 3/0653 | |
| 2024/0233026 | A1* | 7/2024 | Datta | G06Q 10/04 | |

OTHER PUBLICATIONS

Written Opinion of the International Searching Authority dated Jan. 31, 2023 in Application No. PCT/US22/46968.

* cited by examiner

Financial Manager
General Settings > Approval Process Setup

Welcome! This page allows the admin users to manage the approval process.

Status Master

Displaying 5 of 12 Status

| Name | Color |
| --- | --- |
| Saved | # 00B4E5 |
| Pending for Approval | # 00B4E5 |
| Approved by Network Dept. Head | # 00B900 |
| Approved by BU Head | # 00B900 |
| Rejected by Network Dept. Head | # E61717 |

Budget Management Approval Settings

Displaying 5 of 8 version

| Version# | Status | Created By | Create Date |
| --- | --- | --- | --- |
| 2 | Scheduled | User 1 | 09/01/2021 11:12:00 |
| 7 | Scheduled | User 2 | 08/01/2021 11:12:00 |
| 6 | Active | User 3 | 07/01/2021 11:12:00 |
| 5 | Inactive | User 4 | 06/01/2021 11:12:00 |
| 4 | Inactive | User 5 | 05/01/2021 11:12:00 |

Forecast Management Settings

Approval Process    Submission Period    Freeze Month

ⓘ This setup allows user to configure submission period, which lead user to edit and submit forecast only during the configured period. System will auto-submit the forecast if it is not done by the user till end of submission period.

Add Submission Period
⊘ Recurrence Setting

ⓘ System will auto-submit the forecast if it is not done by the user till end of submission period.

January 2022 < >

| Sunday | Monday | Tuesday |
|---|---|---|
| 1 | 2 | 3 Submission Period |
| 8 | 9 | 10 Submission Period |
| 15 | 16 | 17 Submission Period |
| 22 | 23 | 24 Submission Period |
| 29 | 30 | 31 Submission Period |

Previous

This is optional step. Configured Recurrence in previous step will be reflected here.

Financial Manager
General Settings > Approval Process Setup

Welcome! This page allows the admin users to manage the approval process.

Status Master

Displaying 5 of 12 Status

| Name | Color |
|---|---|
| Saved | # 00B4E5 |
| Pending for Approval | # 00B4E5 |
| Approved by Network Dept. Head | # 00B900 |
| Approved by BU Head | # 00B900 |
| Rejected by Network Dept. Head | # E61717 |

Budget Management Approval Settings

Displaying 5 of 8 version

| Version# | Status | Created By | Create Date |
|---|---|---|---|
| 2 | Scheduled | User 1 | 09/01/2021 11:12:00 |
| 7 | Scheduled | User 2 | 08/01/2021 11:12:00 |
| 6 | Active | User 3 | 07/01/2021 11:12:00 |
| 5 | Inactive | User 4 | 06/01/2021 11:12:00 |
| 4 | Inactive | User 5 | 05/01/2021 11:12:00 |

Forecast Management

| Approval Process | Submission Period | Freeze Month |

ⓘ This setup allows user to configure submission period, which lead user to edit and submit forecast only during the configured period. System will auto-submit the forecast if it is not done by the user by end of submission period.

period: From 01January To 31December

Recurrence: Every [1week] From [Monday] [10:00 AM JST] To [Friday] [07:00 PM]

FIG. 9

| | All ⌄ | | 🖨 ⎙ ⋮ 🔔⁸ 👤 |
|---|---|---|---|

⬆

View Restriction ↻

Displaying 5 of 12 View Restriction ⊞

| Role | Org. Level for Data Mapping ⓘ | Status for View Restriction |
|---|---|---|
| Network Dept. Head | Dept. | Pending for Approval, ... +2 |
| BU Head | BU | Approved by Network ... +8 |
| Finance Control Dept | ALL | Approved by BU Head,... +6 |
| Division Head | Division | Approved by FCD, ... +4 |
| BOD | Division | Approved by Div Head,... +2 |

↻

[Department Budget ⌄] ⊞ ✖

Ⓐ {
| Start Date | End Date |
|---|---|
| 08/06/2021 00:00:00 | 09/06/2021 00:00:00 |
| 08/06/2021 00:00:00 | 09/06/2021 00:00:00 |
| 07/06/2021 00:00:00 | 08/06/2021 00:00:00 |
| 06/06/2021 00:00:00 | 07/06/2021 00:00:00 |
| 05/06/2021 00:00:00 | 06/06/2021 00:00:00 |

In case user doesn't make any advanced setting, only Applicable period and recurrence will be displayed. ↻

[2022 ⌄] ⊞ ✎ 🗑

JST }—910

FIG. 9(Continued)

View Restriction

Displaying 5 of 12 View Restriction

| Role | Org. Level for Data Mapping | Status for View Restriction |
|---|---|---|
| Network Dept. Head | Dept. | Pending for Approval, ... +2 |
| BU Head | BU | Approved by Network ... +8 |
| Finance Control Dept | ALL | Approved by BU Head,... +6 |
| Division Head | Division | Approved by FCD, ... +4 |
| BOD | Division | Approved by Div Head,... +2 |

Department Budget ▽

| Start Date | End Date |
|---|---|
| 08/06/2021 00:00:00 | 09/06/2021 00:00:00 |
| 08/06/2021 00:00:00 | 09/06/2021 00:00:00 |
| 07/06/2021 00:00:00 | 08/06/2021 00:00:00 |
| 06/06/2021 00:00:00 | 07/06/2021 00:00:00 |
| 05/06/2021 00:00:00 | 06/06/2021 00:00:00 |

Ⓐ

No Data Added
Add new by clicking button

Add New

FIG. 10(Continued)

Add Freeze Month

From selected date onwards, user will not be able to edit the forecast amount under the month which the date is inserted.

Financial Year*
2022 ▽

| January* | February* |
|---|---|
| 2022-01-31 | 2022-02-28 |

| May* | June* |
|---|---|
| 2022-05-31 | 2022-06-30 |

| September* | October* |
|---|---|
| 2022-09-29 | 2022-10-31 |

Financial Manager
General Settings > Approval Process Setup

🔍 Search

Welcome! This page allows the admin users to manage the approval process.

Status Master                                                    ↻

Displaying 5 of 12 Status                                            ⊞

| Name | Color |
|---|---|
| Saved | ▨ # 00B4E5 |
| Pending for Approval | ▨ # 00B4E5 |
| Approved by Network Dept. Head | ▨ # 00B900 |
| Approved by BU Head | ▨ # 00B900 |
| Rejected by Network Dept. Head | ▨ # E61717 |

Budget Management Approval Settings

Displaying 5 of 8 version

| Version# | Status | Created By | Create Date |
|---|---|---|---|
| 2 | ⊘ Scheduled | ○ User 1 | 09/01/2021 11:12:00 |
| 7 | ⊘ Scheduled | ○ User 2 | 08/01/2021 11:12:00 |
| 6 | ⊘ Active | ○ User 3 | 07/01/2021 11:12:00 |
| 5 | ⊘ Inactive | ○ User 4 | 06/01/2021 11:12:00 |
| 4 | ⊘ Inactive | ○ User 5 | 05/01/2021 11:12:00 |

Ⓐ

Forecast Management Settings

Approval Process    Submission Period    Freeze Month

ⓘ From selected date onwards, user will not be able to edit the forecast amount under the month which the data is inserted.

Due date for the forecast on each month

| January | February | March |
|---|---|---|
| 31 January | 28 February | 31 March |
| July | August | September |
| 31 July | 31 August | 30 September |

FIG. 12

✓ Freeze month on 2022 updated successfully. ✕

View Restriction

Displaying 5 of 12 View Restriction

| Role | Org. Level for Data Mapping | ⓘ Status for View Restriction |
|---|---|---|
| Network Dept. Head | Dept. | Pending for Approval, ... +2 |
| BU Head | BU | Approved by Network ... +8 |
| Finance Control Dept | ALL | Approved by BU Head, ... +6 |
| Division Head | Division | Approved by FCD, ... +4 |
| BOD | Division | Approved by Div Head, ... +2 |

Department Budget ▽

Ⓐ

| Start Date | End Date |
|---|---|
| 08/06/2021 00:00:00 | 09/06/2021 00:00:00 |
| 08/06/2021 00:00:00 | 09/06/2021 00:00:00 |
| 07/06/2021 00:00:00 | 08/06/2021 00:00:00 |
| 06/06/2021 00:00:00 | 07/06/2021 00:00:00 |
| 05/06/2021 00:00:00 | 06/06/2021 00:00:00 |

2022 ▽

April
30 April

May
31 May

June
02 July

October
29 October

November
01 December

December
24 December

FIG. 12(Continued)

Financial Manager
General Settings > Approval Process Setup

🔍 Search

Welcome! This page allows the admin users to manage the approval process.

Status Master

Displaying 5 of 12 Status

| Name | Color |
|---|---|
| Saved | # 00B4E5 |
| Pending for Approval | # 00B4E5 |
| Approved by Network Dept. Head | # 00B900 |
| Approved by BU Head | # 00B900 |
| Rejected by Network Dept. Head | # E61717 |

Budget Management Approval Settings

Displaying 5 of 8 version

| Version# | Status | Created By | Create Date |
|---|---|---|---|
| 2 | Scheduled | User 1 | 09/01/2021 11:12:00 |
| 7 | Scheduled | User 2 | 08/01/2021 11:12:00 |
| 6 | Active | User 3 | 07/01/2021 11:12:00 |
| 5 | Inactive | User 4 | 06/01/2021 11:12:00 |
| 4 | Inactive | User 5 | 05/01/2021 11:12:00 |

Ⓐ

Forecast Management Settings

| Approval Process | Submission Period | Freeze Month |

ⓘ From selected date onwards, user will not be able to edit the forecast amount under the month which the date is inserted.

Due date for the forecast on each month

January: 31 January
February: 28 February
March: 31 March
April: 30 April
July: 31 July
August: 31 August
September: 30 September
October: 29 October

FIG. 13

| | All ⌄ | | 🖨 ⌨ ⋮ 🔔⁸ 👤 |
|---|---|---|---|

View Restriction ↻

Displaying 5 of 12 View Restriction ⊞

| Role | Org. Level for Data Mapping ⓘ | Status for View Restriction |
|---|---|---|
| Network Dept. Head | Dept. | Pending for Approval, ... +2 |
| BU Head | BU | Approved by Network ... +8 |
| Finance Control Dept | All | Approved by BU Head,... +6 |
| Division Head | Division | Approved by FCD, ... +4 |
| BOD | Division | Approved by Div Head,... +2 |

↻

Department Budget ⌄    ⊞ ⊠

Ⓐ
| Start Date | End Date |
|---|---|
| 08/06/2021 00:00:00 | 09/06/2021 00:00:00 |
| 08/06/2021 00:00:00 | 09/06/2021 00:00:00 |
| 07/06/2021 00:00:00 | 08/06/2021 00:00:00 |
| 06/06/2021 00:00:00 | 07/06/2021 00:00:00 |
| 05/06/2021 00:00:00 | 06/06/2021 00:00:00 |

↻

2022 ⌄  ⊞ ✎ [Delete] 🗑

↑
1310

May
[31 May]

June
[02 July]

November
[01 December]

December
[24 December]

APPARATUS AND METHOD FOR CONFIGURING SUBMISSION OF FINANCIAL FORECASTING DATA

CROSS REFERENCE TO RELATED APPLICATIONS

This application is a National Stage of International Application No. PCT/US2022/046968 filed Oct. 18, 2022.

FIELD

Apparatuses and methods consistent with example embodiments of the present disclosure relate to financial forecasting and to configuring submission of financial forecasting data for up-to-date budget comparison. In particular, apparatuses and methods consistent with example embodiments of the present disclosure provide flexibility to more advantageously configure forecasting financial systems and, therefore, improve the overall efficiency of the organization in terms of budget management.

BACKGROUND

Financial forecasting is an important tool used by organizations to predict the organization's financial future and to facilitate decision-making relevant for determining future financial performance. Financial forecasting is an activity that is undertaken in the current financial year in a periodic manner for every month to track the actual expenses incurred by the department to check if there is any deviation from the planned approved budget.

For instance, a department budget for each department of the organization may be prepared annually. Once the annual department budget is prepared and approved, the organization may thereafter check whether the actual expenditures match the approved budget and/or generate forecasting data which forecasts whether the organization may deviate from the approved budget. In other words, when using pre-scheduled/approved/planned budgets, a person in charge must recheck the financial forecasting data submitted by and ensure the financial forecasting is synced with the pre-scheduled/approved/planned budget to ensure the proper usage of financial resources and that the organization is not deviating from the budget approved. The person in charge may then approve or reject the submitted financial forecasting.

In the related art, some organizations use a financial forecasting software module to help the organization prepare and analyze their budgets and to help the organization adapt to any changing plans, circumstances, etc., and forecast expenses accurately. However, in the related art, there is a need for financial forecasting to be carried out in a more systematic and efficient manner. For instance, in a master data section of related art financial forecasting software modules, a forecasting hierarchy has to be set up and it would be helpful for a configuration of a submission period to be established. However, the related art does not give users the freedom to configure an on-the-fly system, with pre-defined configured rules for data submission management. Thus, the adaptability and scalability of the related art is a disadvantage.

In particular, the related art does not provide the ability to define submission periods within a freeze period for the timely periodic submission of forecast data.

SUMMARY

According to embodiments, apparatuses and methods are provided for data configuration for financial forecasting. A non-limiting embodiment provide flexibility to more advantageously configure forecasting financial systems and, therefore, improve the overall efficiency of the organization in terms of budget management.

An example embodiment provides an apparatus for managing submission of financial forecasting data, the apparatus including: a memory storing instructions; a processor configured to execute the stored instructions to implement operations including: controlling a user interface to be displayed on a display; controlling receiving and storing of submitted financial forecasting data; controlling receiving and storing of a freeze time that is input using the user interface, wherein the freeze time indicates a time after which financial forecasting data, which was already submitted before the freeze time, cannot be modified by users; controlling receiving and storing of submission period configuration data that is input using the user interface, wherein the submission period configuration data configures multiple submission periods that will occur before the freeze time, and wherein the submission periods are periods during which financial forecasting data may be submitted and periods outside of which submission of financial forecasting data is restricted; and controlling generating a financial forecast using the stored submitted financial forecasting data.

An example embodiment may provide the apparatus wherein the controlling the generating the financial forecast includes comparing the stored submitted financial forecasting data to a previously approved budget.

An example embodiment may provide the apparatus wherein the operations further comprise receiving one freeze time in each one of a plurality of months, and wherein the submission period configuration data configures multiple submission periods that will occur before the respective freeze time in each one of the plurality of months.

An example embodiment may provide the apparatus wherein the controlling the receiving and storing of submitted financial forecasting data includes auto-submitting financial forecasting data in response to determining that a user did not submit financial forecasting data during one of the submission periods.

An example embodiment may provide the apparatus wherein the submission period configuration data configures at least one submission period for each week that will occur before the freeze time.

An example embodiment may provide the apparatus wherein the operations further comprise: controlling receiving and storing of an approval of the stored submitted financial forecasting data; and controlling generating the financial forecast using only the approved stored submitted financial forecasting data.

An example embodiment may provide the apparatus wherein the operations further comprise controlling the user interface to display a reminder to submit financial forecasting data before a current one of the submission periods ends.

An example embodiment may provide a method for managing submission of financial forecasting data, the method including: controlling, by a processor, a user interface to be displayed on a display; controlling, by the processor, receiving and storing of submitted financial forecasting data; controlling, by the processor, receiving and storing of a freeze time that is input using the user interface, wherein the freeze time indicates a time after which financial forecasting data, which was already submitted before the freeze time, cannot be modified by users; controlling, by the processor, receiving and storing of submission period configuration data that is input using the user interface, wherein the submission period configuration data configures multiple submission periods that will occur before the freeze time, and wherein the submission periods are periods during which financial forecasting data may be submitted and periods outside of which submission of financial forecasting data is restricted; and controlling, by the processor, generating a financial forecast using the stored submitted financial forecasting data.

An example embodiment may provide a method wherein the controlling the generating the financial forecast includes comparing the stored submitted financial forecasting data to a previously approved budget.

An example embodiment may provide a method wherein the method further includes receiving one freeze time in each one of a plurality of months, and wherein the submission period configuration data configures multiple submission periods that will occur before the respective freeze time in each one of the plurality of months.

An example embodiment may provide a method wherein the controlling the receiving and storing of submitted financial forecasting data includes auto-submitting financial forecasting data in response to determining that a user did not submit financial forecasting data during one of the submission periods.

An example embodiment may provide a method wherein the submission period configuration data configures at least one submission period for each week that will occur before the freeze time.

An example embodiment may provide a method wherein the method further includes: controlling receiving and storing of an approval of the stored submitted financial forecasting data; and controlling generating the financial forecast using only the approved stored submitted financial forecasting data.

An example embodiment may provide a method wherein the method further includes controlling the user interface to display a reminder to submit financial forecasting data before a current one of the submission periods ends.

An example embodiment may provide a non-transitory computer readable storage medium storing instructions which, if executed, cause a processor to implement operations for managing submission of financial forecasting data, the operations including: controlling, by the processor, a user interface to be displayed on a display; controlling, by the processor, receiving and storing of submitted financial forecasting data; controlling, by the processor, receiving and storing of a freeze time that is input using the user interface, wherein the freeze time indicates a time after which financial forecasting data, which was already submitted before the freeze time, cannot be modified by users; controlling, by the processor, receiving and storing of submission period configuration data that is input using the user interface, wherein the submission period configuration data configures multiple submission periods that will occur before the freeze time, and wherein the submission periods are periods during which financial forecasting data may be submitted and periods outside of which submission of financial forecasting data is restricted; and controlling, by the processor, generating a financial forecast using the stored submitted financial forecasting data.

An example embodiment may provide a non-transitory computer readable storage medium wherein the controlling the generating the financial forecast includes comparing the stored submitted financial forecasting data to a previously approved budget.

An example embodiment may provide a non-transitory computer readable storage medium wherein the operations further comprise receiving one freeze time in each one of a plurality of months, and wherein the submission period configuration data configures multiple submission periods that will occur before the respective freeze time in each one of the plurality of months.

An example embodiment may provide a non-transitory computer readable storage medium wherein the controlling the receiving and storing of submitted financial forecasting data includes auto-submitting financial forecasting data in response to determining that a user did not submit financial forecasting data during one of the submission periods.

An example embodiment may provide a non-transitory computer readable storage medium wherein the submission period configuration data configures at least one submission period for each week that will occur before the freeze time.

An example embodiment may provide a non-transitory computer readable storage medium wherein the operations further comprise: controlling receiving and storing of an approval of the stored submitted financial forecasting data; and controlling generating the financial forecast using only the approved stored submitted financial forecasting data.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 3 shows an Approval Process Setup page according to an example embodiment;

FIG. 4 shows an "Add Submission Period" window of a user interface according to an example embodiment;

FIG. 5 shows an "Add Submission Period" window of a user interface according to an example embodiment, which has been modified to specify the submission period;

FIG. 6 shows an "Add Submission Period" window of a user interface according to an example embodiment, which has been modified to specify the submission period;

FIG. 9 shows an "Approval Process Setup" page of a user interface according to an example embodiment wherein a submission period has been added;

FIG. 11 shows an "Add Freeze Month" window of a user interface according to an example embodiment;

FIG. 12 shows an "Approval Process Setup" page of a user interface according to an example embodiment wherein a "Freeze Month" configuration has been added;

FIG. 13 shows an "Approval Process Setup" page of a user interface according to an example embodiment wherein a delete button for the "Freeze Month" configuration has been highlighted.

DETAILED DESCRIPTION

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
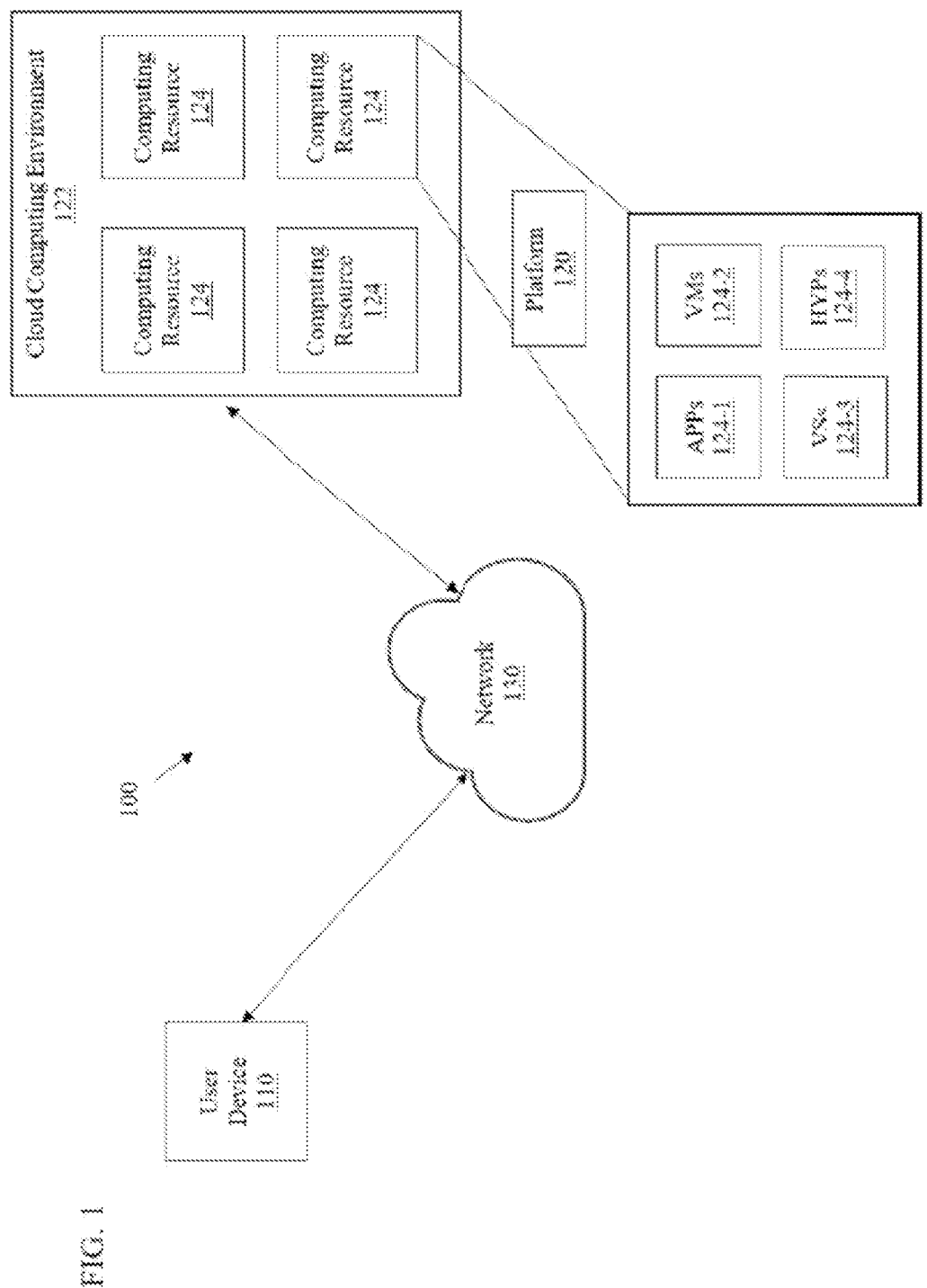
FIG. 1 is a diagram of an example environment in which systems and/or methods, described herein, may be implemented.

FIG. 1 is a diagram of an example environment 100 in which systems and/or methods, described herein, may be implemented. As shown in FIG. 1, environment 100 may include a user device 110, a platform 120, and a network 130. Devices of environment 100 may interconnect via wired connections, wireless connections, or a combination of wired and wireless connections. In embodiments, any of the functions and operations described with reference to FIG. 1 above may be performed by any combination of elements illustrated in FIG. 1.

User device 110 is an apparatus which includes one or more devices capable of receiving, generating, storing, processing, and/or providing information associated with platform 120. For example, user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 110 may receive information from and/or transmit information to platform 120.

Platform 120 includes one or more devices capable of receiving, generating, storing, processing, and/or providing information. In some implementations, platform 120 may include a cloud server or a group of cloud servers. In some implementations, platform 120 may be designed to be modular such that certain software components may be swapped in or out depending on a particular need. As such, platform 120 may be easily and/or quickly reconfigured for different uses.

In some implementations, as shown, platform 120 may be hosted in cloud computing environment 122. Notably, while implementations described herein describe platform 120 as being hosted in cloud computing environment 122, in some implementations, platform 120 may not be cloud-based (i.e., may be implemented outside of a cloud computing environment) or may be partially cloud-based.

Cloud computing environment 122 includes an environment that hosts platform 120. Cloud computing environment 122 may provide computation, software, data access, storage, etc. services that do not require end-user (e.g., user device 110) knowledge of a physical location and configuration of system(s) and/or device(s) that hosts platform 120. As shown, cloud computing environment 122 may include a group of computing resources 124 (referred to collectively as "computing resources 124" and individually as "computing resource 124").

Computing resource 124 includes one or more personal computers, a cluster of computing devices, workstation computers, server devices, or other types of computation and/or communication devices. In some implementations, computing resource 124 may host platform 120. The cloud resources may include compute instances executing in computing resource 124, storage devices provided in computing resource 124, data transfer devices provided by computing resource 124, etc. In some implementations, computing resource 124 may communicate with other computing resources 124 via wired connections, wireless connections, or a combination of wired and wireless connections.

As further shown in FIG. 1, computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

Application 124-1 includes one or more software applications that may be provided to or accessed by user device 110. Application 124-1 may eliminate a need to install and execute the software applications on user device 110. For example, application 124-1 may include software associated with platform 120 and/or any other software capable of being provided via cloud computing environment 122. In some implementations, one application 124-1 may send/receive information to/from one or more other applications 124-1, via virtual machine 124-2.

Virtual machine 124-2 includes a software implementation of a machine (e.g., a computer) that executes programs like a physical machine. Virtual machine 124-2 may be either a system virtual machine or a process virtual machine, depending upon use and degree of correspondence to any real machine by virtual machine 124-2. A system virtual machine may provide a complete system platform that supports execution of a complete operating system ("OS"). A process virtual machine may execute a single program, and may support a single process. In some implementations, virtual machine 124-2 may execute on behalf of a user (e.g., user device 110), and may manage infrastructure of cloud computing environment 122, such as data management, synchronization, or long-duration data transfers.

Virtualized storage 124-3 includes one or more storage systems and/or one or more devices that use virtualization techniques within the storage systems or devices of computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 124-4 may provide hardware virtualization techniques that allow multiple operating systems (e.g., "guest operating systems") to execute concurrently on a host computer, such as computing resource 124. Hypervisor 124-4 may present a virtual operating platform to the guest operating systems, and may manage the execution of the guest operating systems. Multiple instances of a variety of operating systems may share virtualized hardware resources.

Network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
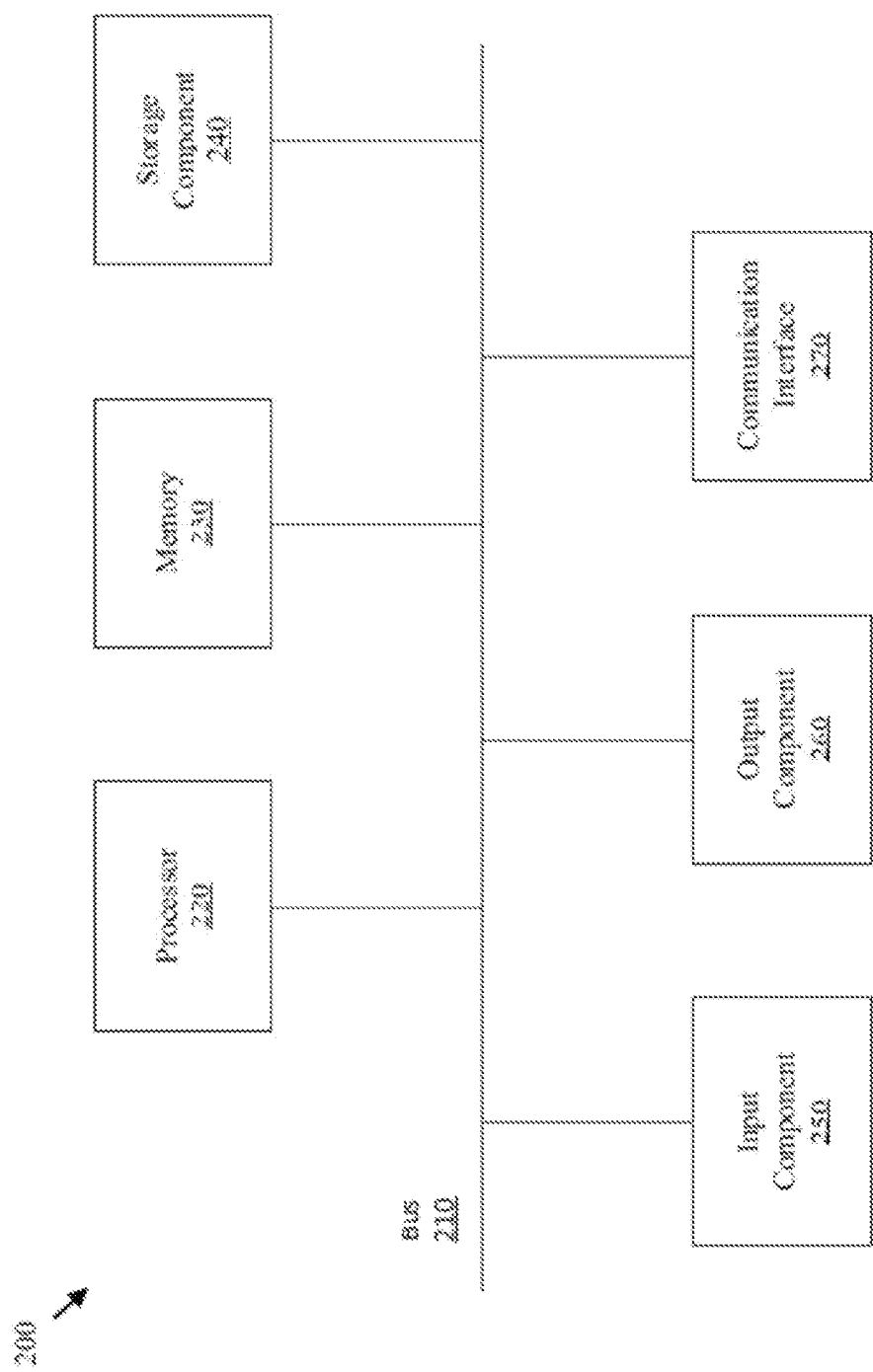
FIG. 2 is a diagram of example components of a device according to an example embodiment.

FIG. 2 is a diagram of example components of a device 200. Device 200 is an apparatus and may correspond to user device 110 and/or platform 120. As shown in FIG. 2, device 200 may include a bus 210, a processor 220, a memory 230, a storage component 240, an input component 250, an output component 260, and a communication interface 270.

Bus 210 includes a component that permits communication among the components of device 200. Processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Example embodiments of the present disclosure provide an apparatus and method in which a user may configure the submission and approval process for financial forecasting data, such as actual expenditures, forecasted expenditures and the like. Indeed, according to an example embodiment, an organization's approval process for submitted financial forecasting data (e.g., submitted throughout each year) may differ from the annual budget approval process.

Thus, according to an example embodiment, a user may configure, define or set a custom periodic submission period during which each appropriate user, department or the like, may submit and edit financial forecasting data. For instance, according to an example embodiment, the submission period may be defined as starting on Monday and ending on Wednesday of each week. In addition, the user may also adjust the times and/or dates for a defined submission period to account for organization events, holidays, etc. The submission period is user-defined and may include any period of time including, but not limited to, day(s), week(s), month(s), year(s), etc. According to an example embodiment, users may only submit financial forecasting data during the configured submission periods. Further, according to an example embodiment, the organization may ask or require users to regularly submit financial forecasting data during the configured submission periods to ensure that the submitted financial forecasting data is up to date.

Then, the submitted financial forecasting data is either approved or rejected by a person in charge. Moreover, periodically (e.g., once a week, biweekly, once a month, etc.) the submitted financial forecasting data are compared to the approved budget (e.g., on a real-time basis) to determine whether the organization has deviated, or is forecasted to deviate, from the budget that was approved.

This recheck of financial forecasting may occur periodically, at a variety of different times across the organization. For instance, one aspect of the organization in Asia may recheck financial forecasting data once per week, whereas other aspects of the organization in the United States may recheck financial forecasting data once per month. As another example, different departments within the organization may recheck financial forecasting data using any variety of different time periods. Additionally, employees across the organization may submit their financial data at different times, and different frequencies, with different work schedules and holiday calendars, and different submission periods.

In addition to configuring submission periods for submitting and editing financial forecasting data, an organization may also configure freeze periods, for instance one day of each month, after which submitted financial forecasting data may no longer be submitted, modified and/or edited. However, the present disclosure is not limited to the aforementioned example, and freeze periods may be configured using any period of time. An organization may configure freeze periods for a wide variety of different reasons, including, but not limited to, ensure integrity of submitted financial forecasting data.

As one example, a user may configure periodic freeze periods which end on the last day of each month and the user may configure submission periods which extend from Monday to Wednesday of each week. Thus, according to this example, during the month of January, users may only submit financial forecasting data on Mondays, Tuesdays or Wednesdays. On Thursdays and Fridays, users are prohibited from submitting financial forecasting data. Additionally, according to this example, since periodic freeze periods have been configured which end on the last day of each month, after January 31 has elapsed, and it is now the month of February, then users are prohibited from submitting and editing any financial forecasting data for the month of January. According to an example embodiment, most users may be prohibited from submitting and editing any financial forecasting data for the month of January, whereas some privileged users may still be allowed to submit and edit financial forecasting data, such as managers of the Accounting Department who are correcting errors in the financial forecasting data.

Thus, according to an example embodiment, a user may select a custom time after which data submission and/or editing for a certain period is frozen (i.e., forecasting data for a prior period may no longer be submitted and/or edited. According to an example embodiment, a user may define a custom "Freeze Month" by configuring a particular day of each month after which submission and editing of financial forecasting data is effectively frozen. According to an example embodiment, a user may select the same day of each month to end each monthly freeze period, or a user may select different days of each month to end each monthly freeze period, as desired. Moreover, freeze periods may not be limited to monthly freeze periods and according to various example embodiments, freeze periods may be configured for any period of time.

An example embodiment may provide a user interface configured to implement the aforementioned features, and other features not explicitly mentioned above. As one example, a user interface may be implemented on user device 110, as shown in FIG. 1, or implemented on device 200, as shown in FIG. 2.

Figure 3:
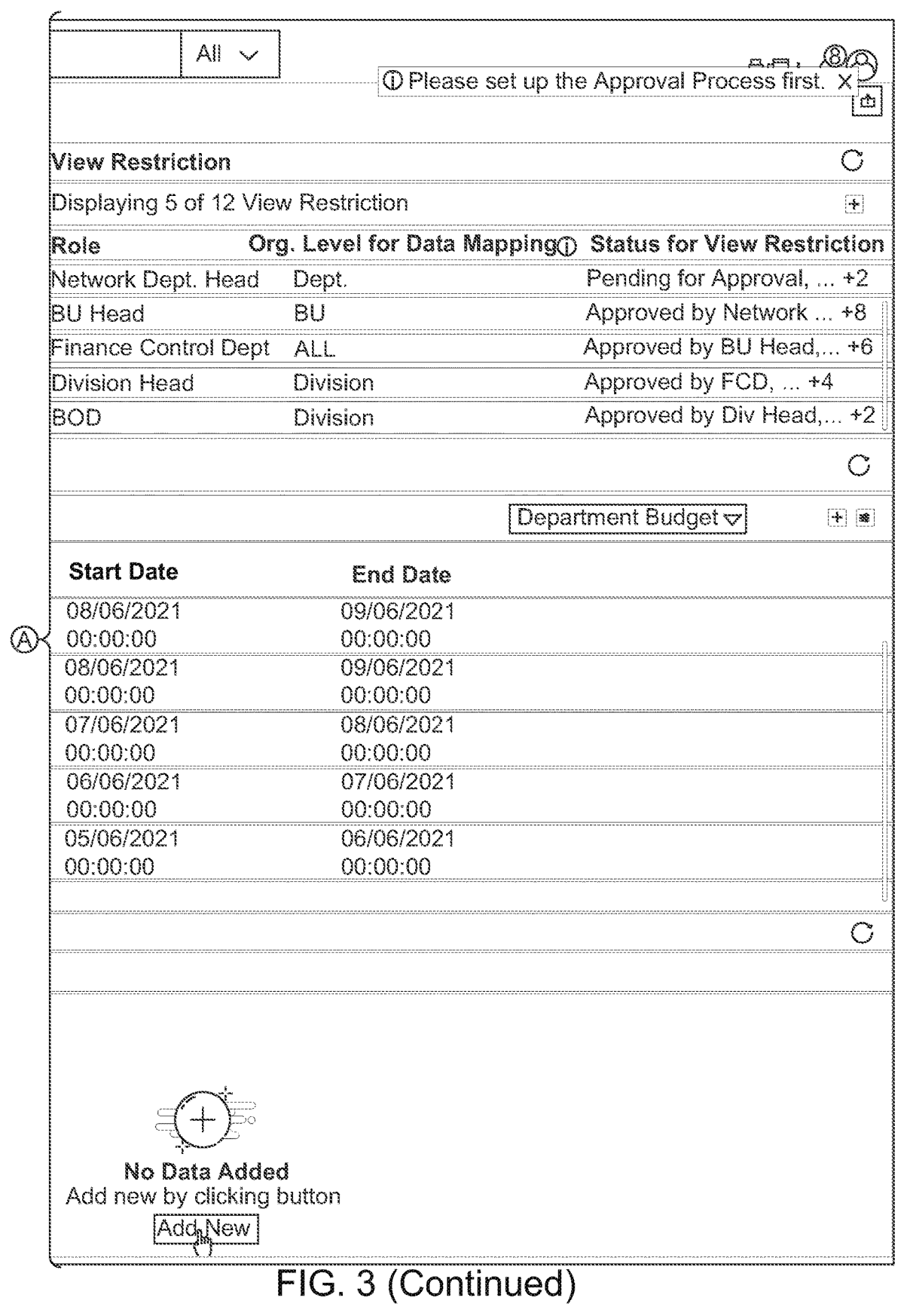

FIG. 3 shows an "Approval Process Setup" page 300 of a user interface according to an example embodiment. This "Approval Process Setup" page 300 allows users to configure and manage the approval process. For instance, a "Status Master" section of the "Approval Process Setup" page 300 shows the respective statuses of various aspects of the approval process. Further, a "View Restriction" section of the "Approval Process Setup" page 300 shows various view restrictions employed in the approval process. As shown in FIG. 3, the "Approval Process Setup" page 300 also includes a "Budget Management Approval Settings" section and a "Forecast Management Settings" section. According to an example embodiment, as shown in FIG. 3, the "Forecast Management Settings" section may include several tabs such as an "Approval Process" tab, a "Submission Period" tab and a "Freeze Month" tab.

As shown in FIG. 3, the "Submission Period" tab of the "Approval Process Setup" page 300 allows the user to configure a submission period within which a user may edit and submit forecast data. That is, an example embodiment links the data forecasting process with a custom configured submission period. As shown in FIG. 3, the "Submission Period" tab indicates "No Data Added", meaning that a submission period has not yet been configured. The user may select the "Submission Period" tab and then select the "Add New" button to add a new submission period using an "Add Submission Period" 400 window of the user interface, which is shown in FIG. 4.

According to an example embodiment, a user may only edit and submit forecast data within this configured submission period. Also, according to an example embodiment, the forecast data may be auto-submitted if it is not submitted by a user within the configured submission period. For instance, if a user forgets to submit forecasting data during the configured submission period, or the user is on vacation, etc., then forecast data may be auto-submitted based on prior history of forecasting data, the most recent forecasting data approved, or the like. After the forecast data is submitted by the user, or the forecast data is auto-submitted, then the submitted forecast data may be approved or rejected by a person in charge.

As shown in FIG. 3, the "Approval Process Setup" page 300 of the user interface may also include a "Freeze Month" tab under the "Forecast Management Setting" heading, which allows the user to configure or define a custom "Freeze Month". As an example, a "Freeze Month" may be defined as ending on the last day of each month. Thus, for example, if the current month is August, then all forecasting data before August $1^{st}$ is frozen and generally cannot be modified. That is, since the current month is August, then the user may not modify any forecasting data from July, June or any other month prior to the current month, August.

Figure 4:
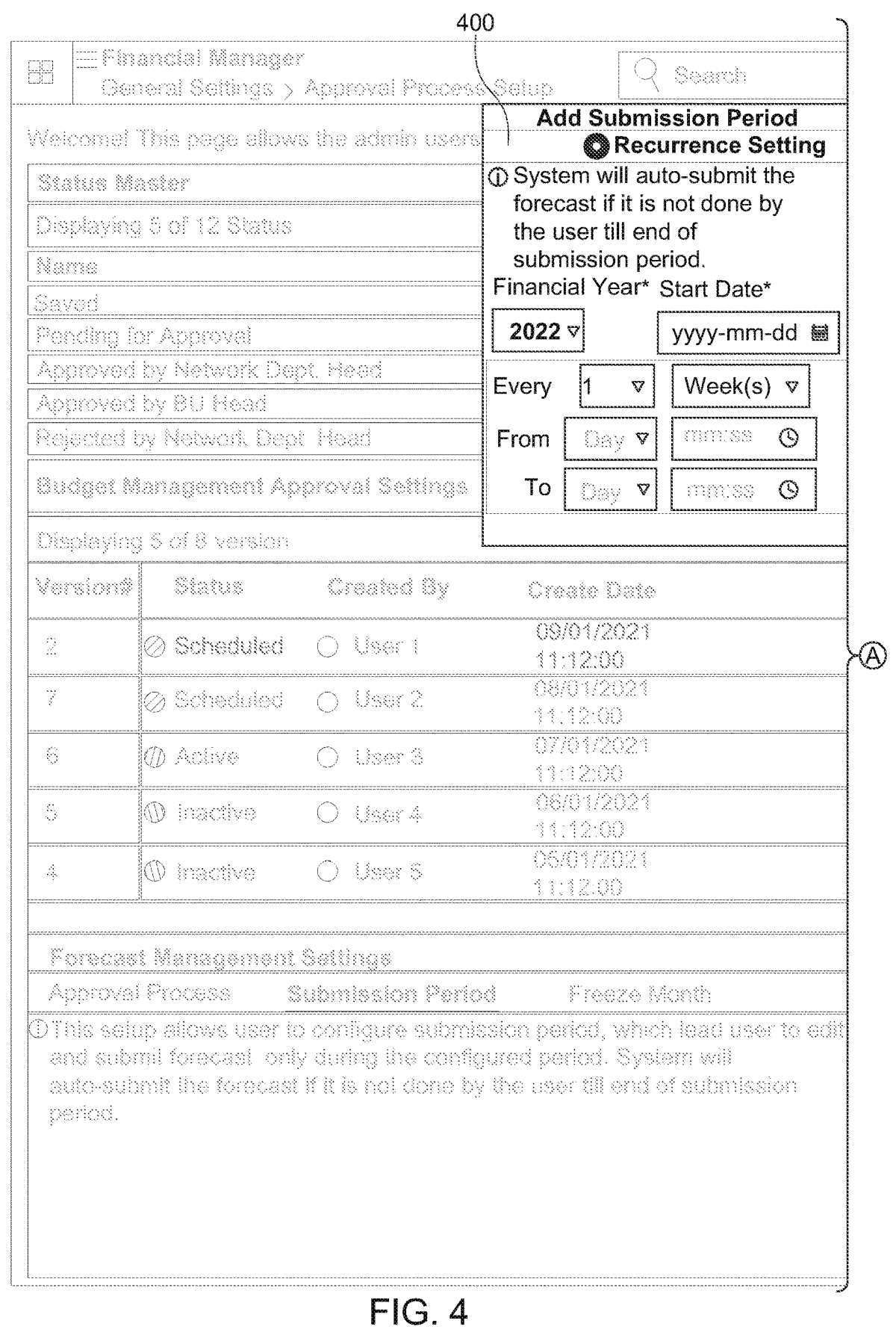
Figure 4:
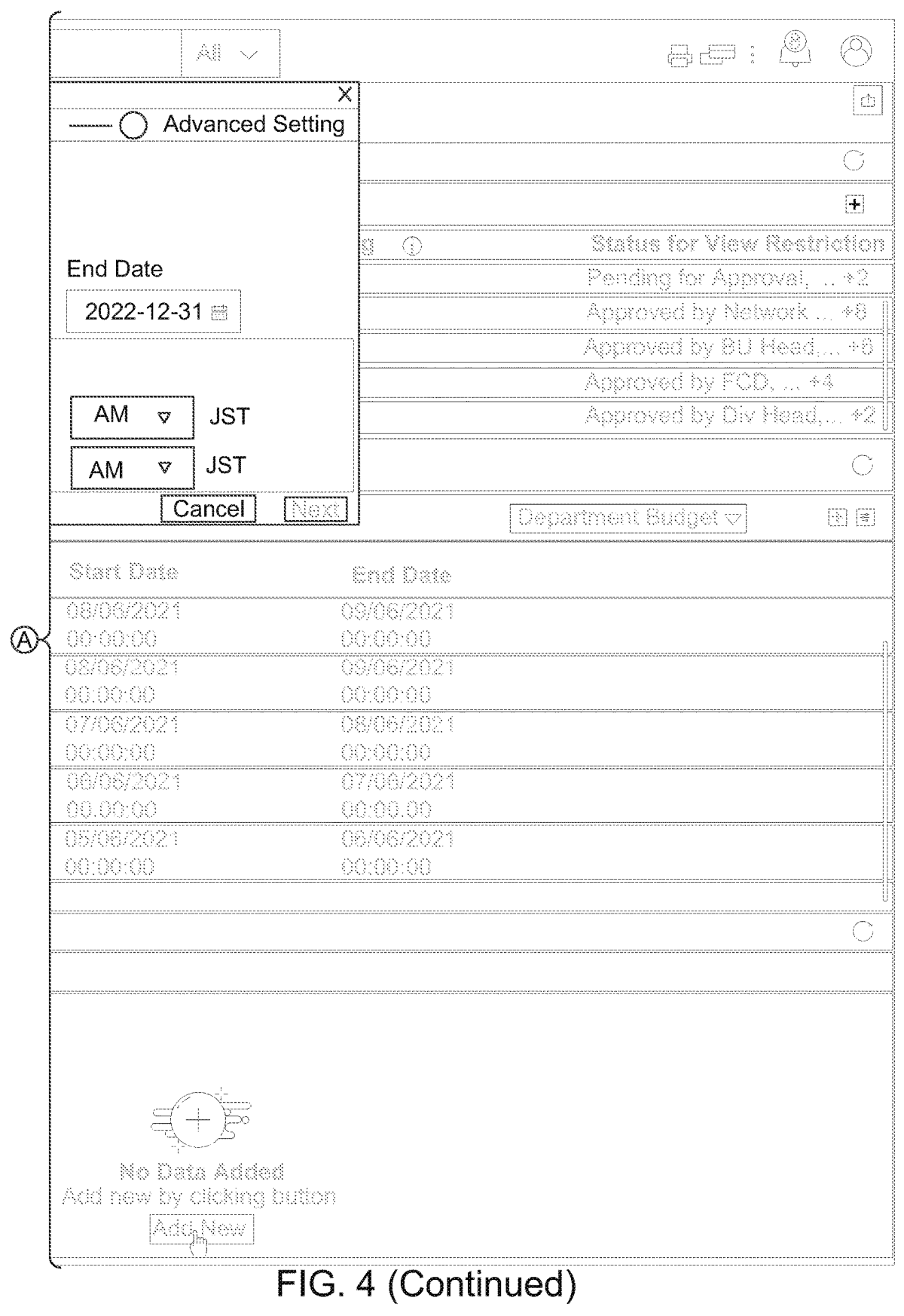

FIG. 4 shows an "Add Submission Period" window 400 of a user interface according to an example embodiment. As shown in FIG. 4, a user may add a submission period and configure the submission period in the desired manner. For instance, according to the example embodiment shown in FIG. 4, a user may select a "Recurrence Setting" button and then may define a recurring submission period. As shown in FIG. 4, the user has selected the Financial Year 2022 and has defined the recurring submission period as occurring every one week. The user has may also set a date from which the recurring submission period will begin and a date on which the recurring submission period will end. According to an example embodiment, the submission period is a period during which the user may submit and edit forecasting data and may be configured as the only period during which the user may submit and edit forecasting data.

Figure 5:
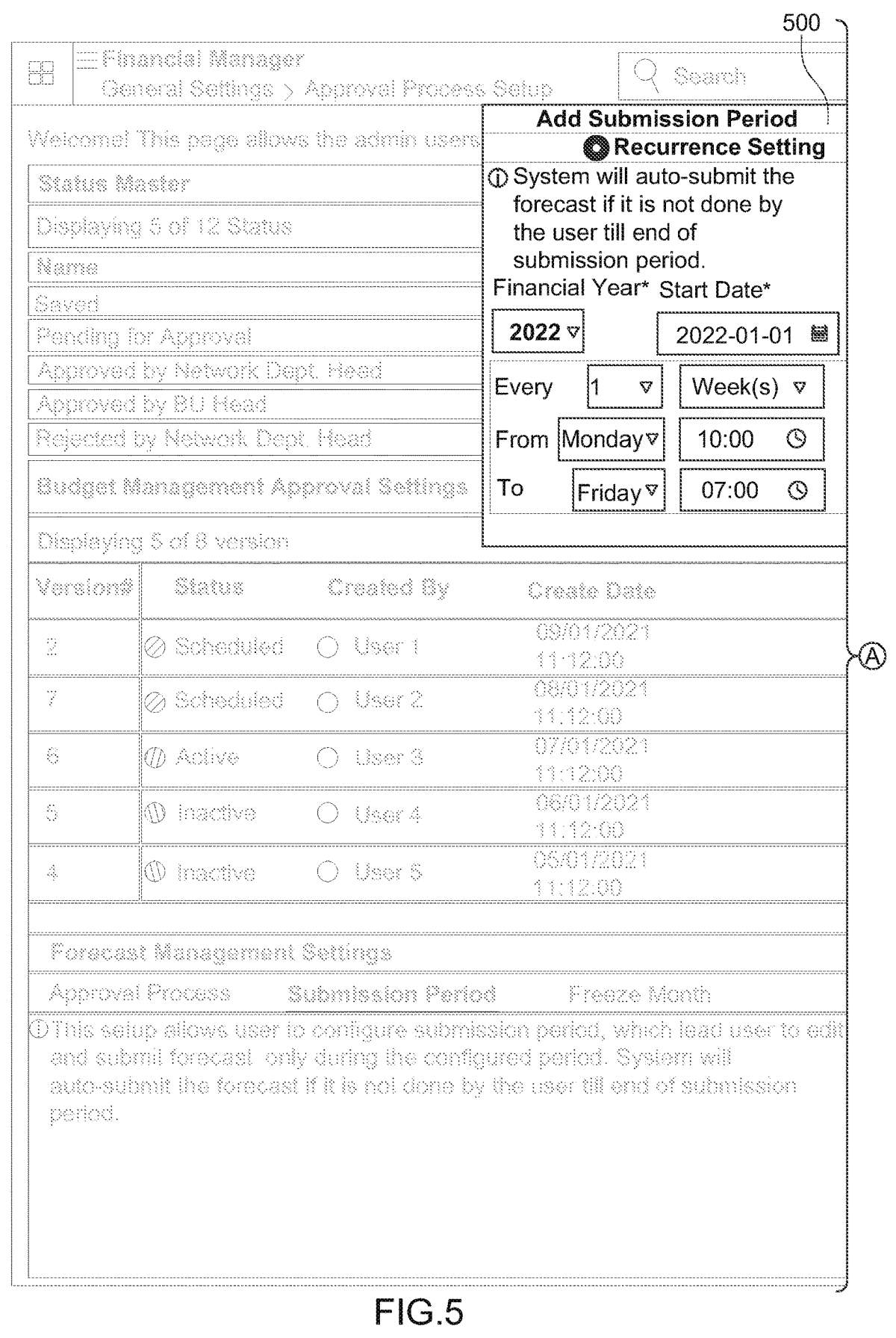
Figure 5:
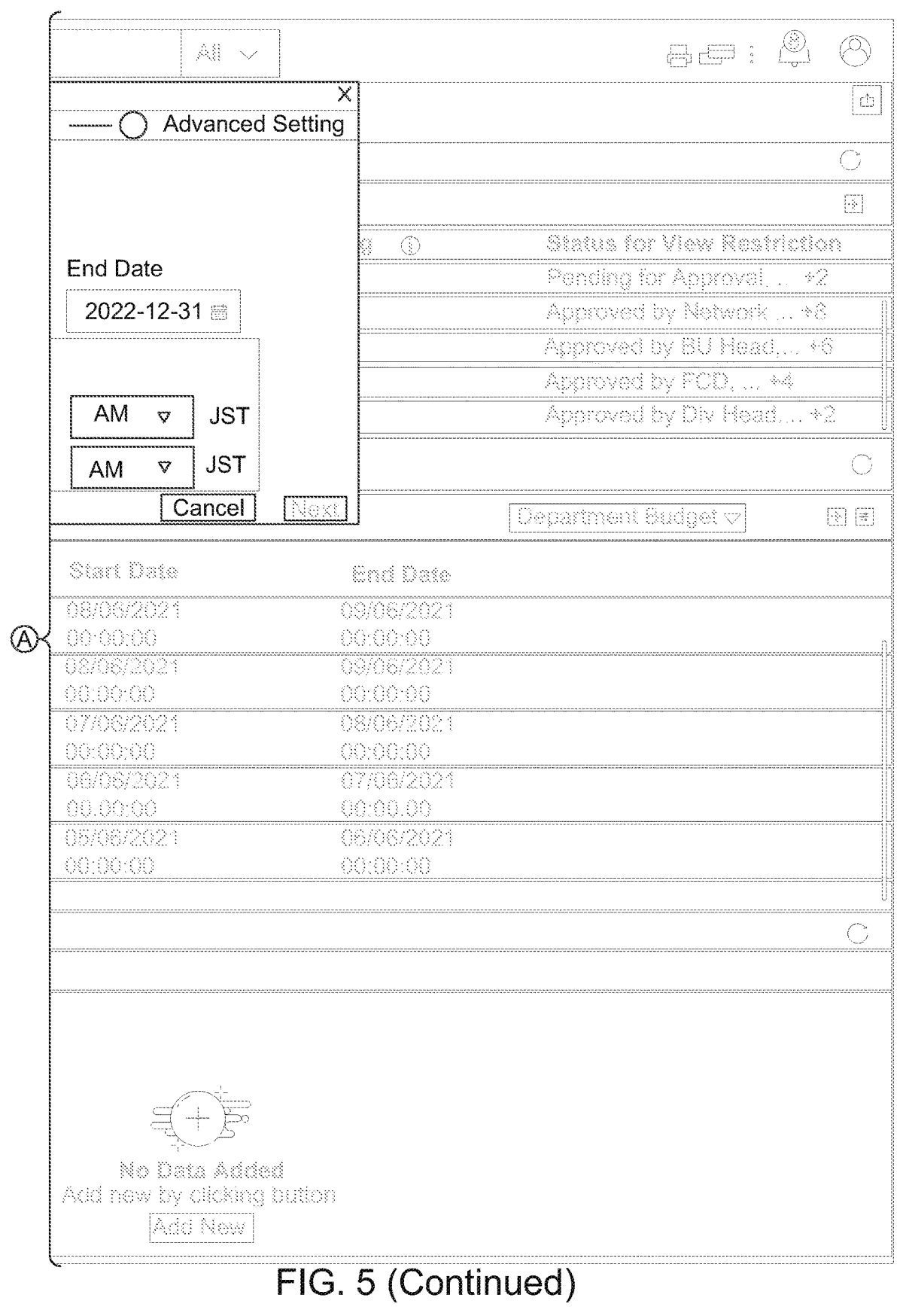

FIG. 5 shows an "Add Submission Period" 500 window of a user interface according to an example embodiment, which has been modified to specify a recurrence setting for the submission period. In particular, as shown in FIG. 5, a recurring submission period for the Financial Year 2022 is set to start on Jan. 1, 2022 and to recur every 1 week beginning at Monday at 10:00 AM and ending on Friday at 7:00 PM. That is, a user may submit and edit forecasting data each week at any time between Monday at 10:00 AM and Friday at 7:00 PM, and outside of these times the submission period is closed and a user may not submit or edit forecast data. Further, according to an example embodiment, if a user fails to submit any forecasting data for a particular week by the end of a respective submission period, then forecasting data is automatically submitted (e.g., based on prior history of forecasting data, the most recent forecasting data approved, or the like). However, the embodiment shown in FIG. 5 is only an example and a wide variety of different submission periods may be configured by the user.

Figure 6:
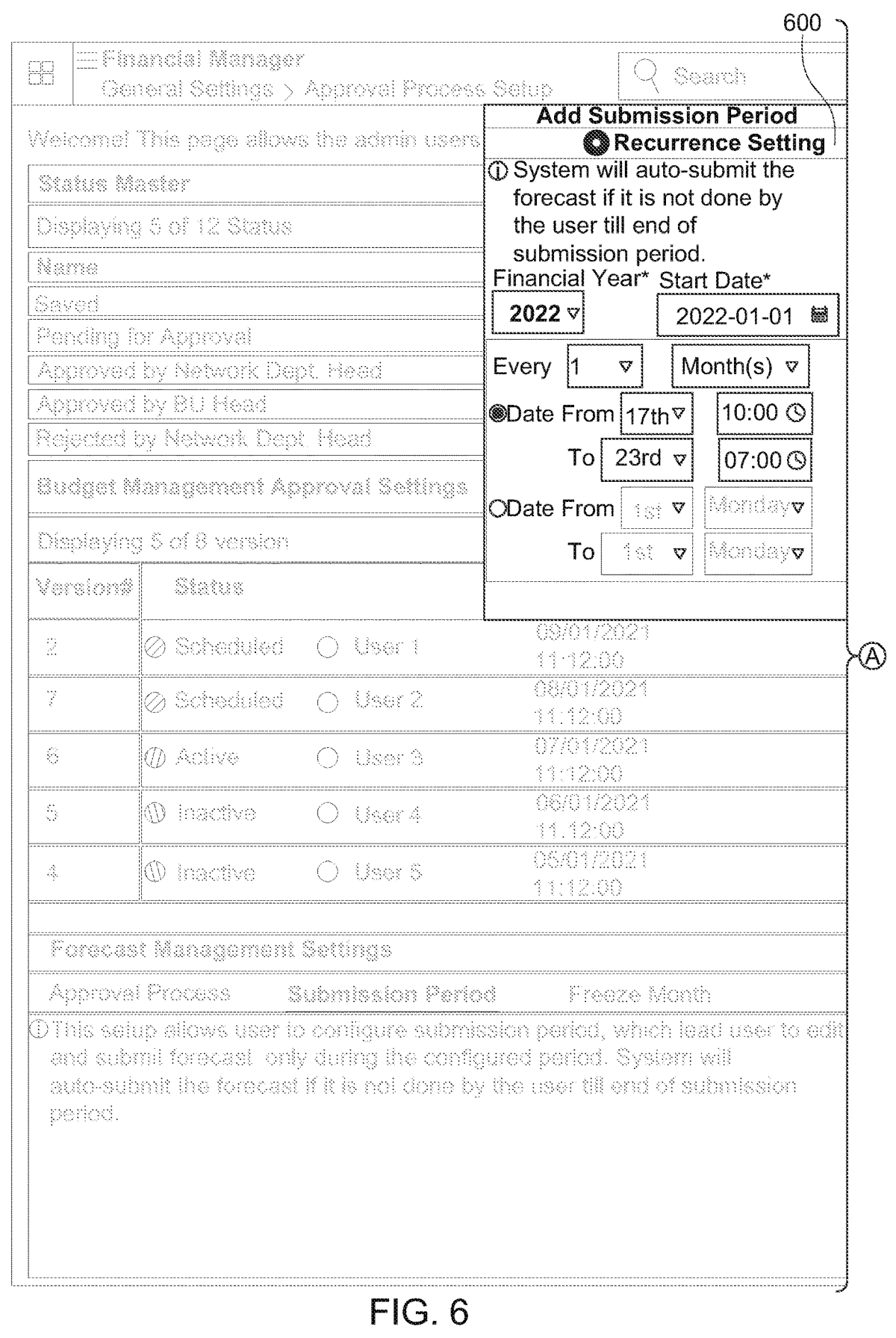
Figure 6:
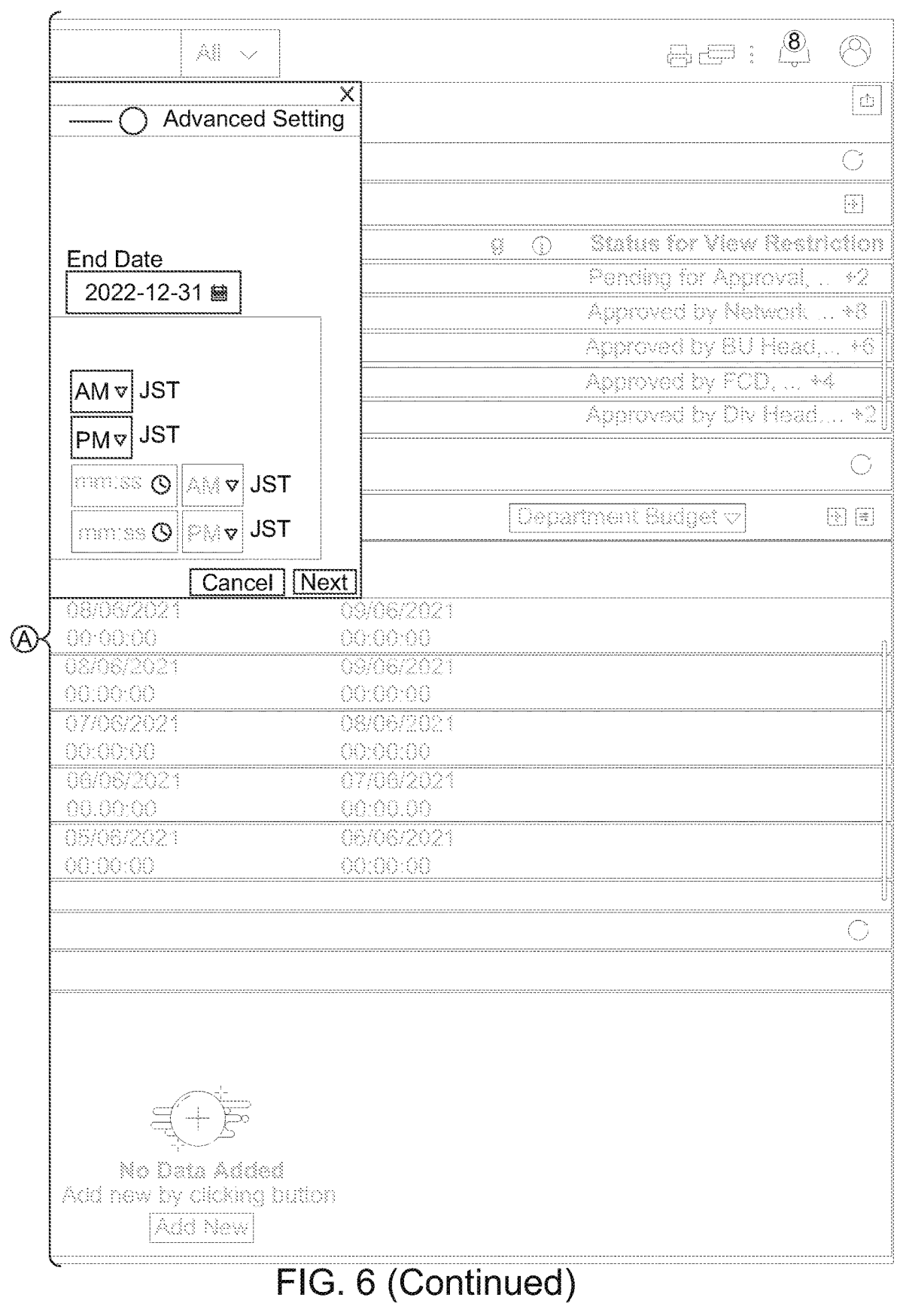

FIG. 6 shows an "Add Submission Period" window 600 of a user interface according to an example embodiment, which has been modified to specify a different recurrence setting for the submission period. In particular, as shown in FIG. 6, a recurring submission period for the Financial Year 2022 is set to start on Jan. 1, 2022 and to recur every 1 month from the $17^{th}$ of the month beginning at 10:00 AM an ending on the $23^{rd}$ of the month at 7:00 PM.

Figure 7:
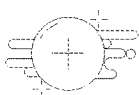
FIG. 7 shows a calendar view of an "Add Submission Period" window of a user interface according to an example embodiment.

FIG. 7 shows a calendar view of an "Add Submission Period" window 700 of a user interface according to an example embodiment. As shown in FIG. 7, after configuring a recurring submission period, defined by the user as beginning on Monday and ending on Friday, the user has selected an "Advanced Setting" button. That is, the recurring submission period that was previously set is reflected in a calendar view, as shown in FIG. 7. This is an optional step wherein the configured recurrence established in the previous step is reflected in a calendar view and may be further configured using the calendar view.

Figure 8:
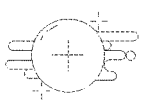
FIG. 8 shows a calendar view of an "Add Submission Period" window of a user interface according to an example embodiment.

FIG. 8 shows a calendar view of an "Add Submission Period" window 800 of a user interface according to an example embodiment. As shown in FIG. 8, the user has selected the "Advanced Setting" button and has defined submission periods which differ from week to week (e.g., in view of holidays, etc.), as shown in a calendar view. For instance, a user may drag or click on a particular date(s) and an "Edit Submission Period" window 810 may appear, which allows the user to configure date(s) and time(s) for the submission period(s) to be added. According to the example embodiment shown in FIG. 8 the default time is auto populated in the "Edit Submission Period" window 810 based on the configured recurrence established in the previous step. Additionally, according to an example embodiment, the title is editable in case a user wants to change "Submission Period" to some other title. However, according to the example embodiment shown in FIG. 8, the title "Submission Period" is auto generated by default. According to an example embodiment, the "Edit Submission Period" window may be closed, for instance, by clicking anywhere outside the "Edit Submission Period" window.

FIG. 9 shows an "Approval Process Setup" page 900 of a user interface according to an example embodiment wherein a submission period 910 has been added. In particular, FIG. 9 shows a case where a user did not make any Advance Setting for the configured submission period and, thus, only the applicable period and the recurrence for the submission period is displayed.

Figure 10:
FIG. 10 shows an "Approval Process Setup" page of a user interface according to an example embodiment wherein the "Freeze Month" tab has been selected.

FIG. 10 shows an "Approval Process Setup" page 1000 of a user interface according to an example embodiment wherein the "Freeze Month" tab has been selected. The "Freeze Month" tab of the "Approval Process Setup" page allows the user to select a freeze period by selecting a date, for each month, on which editing of the forecast data is frozen. That is, from the selected date onwards, a user will not be able to edit the approved forecast data for the respective month under which the date is selected. According to an example embodiment, forecast data that is not approved (i.e. rejected) may not be frozen but may be adjusted until ultimately approved. According to an example embodiment, a small number of privileged users, such as managers of the Accounting Department, may be granted the ability to edit or correct frozen forecast data, as needed, through an authorized correction process.

As shown in FIG. 10, the "Freeze Month" tab indicates "No Data Added", meaning that a "Freeze Month" has not yet been configured. The user may select the "Freeze Month" tab and then select the "Add New" button to add a new "Freeze Month" using an "Add Freeze Month" window 1100 of the user interface, which is shown in FIG. 11.

Figure 11:
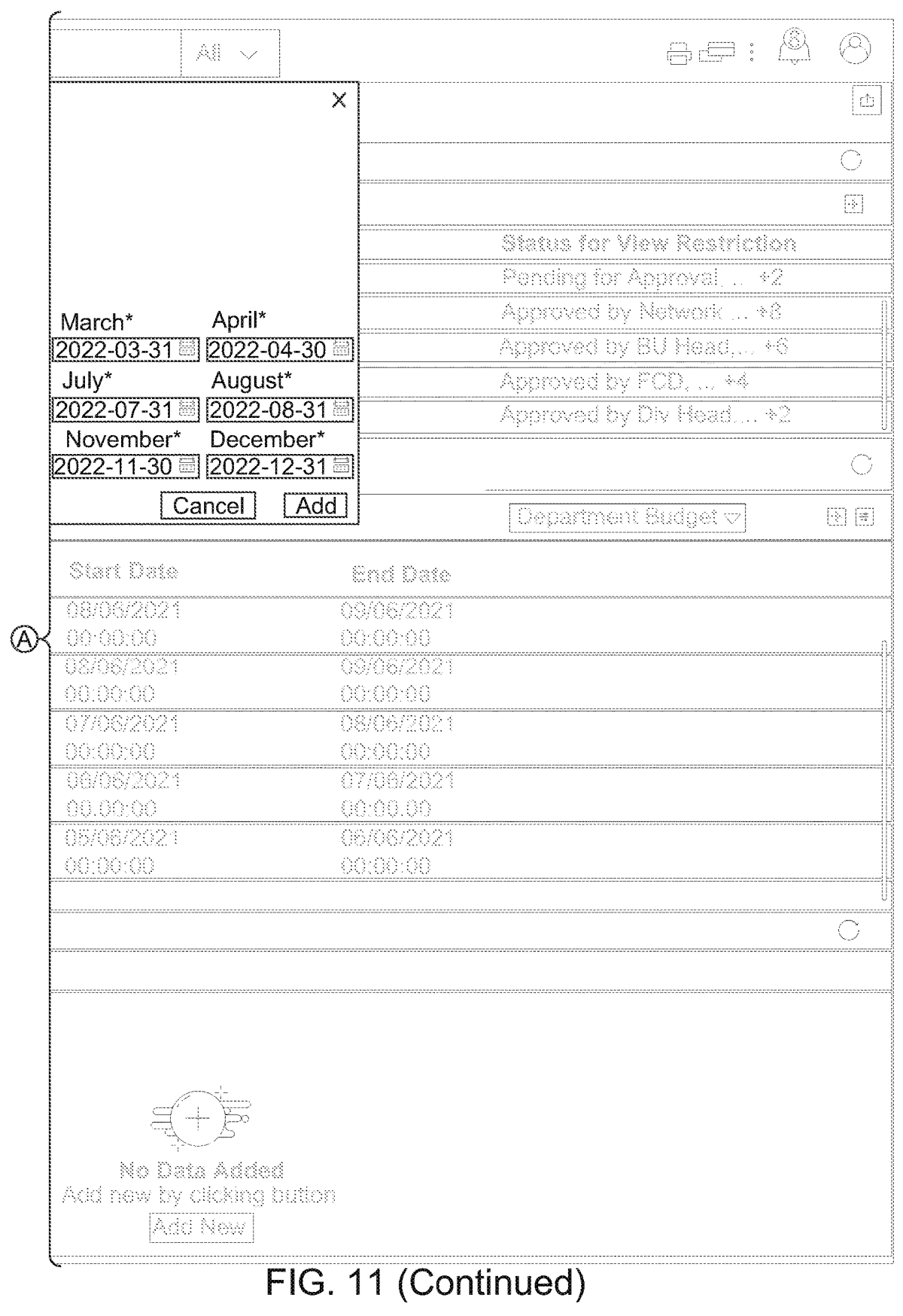

FIG. 11 shows an "Add Freeze Month" window 1100 of a user interface according to an example embodiment. As shown in FIG. 11, the user may select the particular Financial Year for which freeze months are to be configured. For instance, as shown in FIG. 11, from Jan. 31, 2022, onwards, a user will not be able to edit any forecast data for the month of January, 2022. However, before Jan. 31, 2022, the user may edit the forecast data for the month of January, 2022. Similarly, as shown in FIG. 11, from Feb. 28, 2022, onwards, a user will not be able to edit any forecast data for the month of February, 2022. As shown in FIG. 11, a user may select a date, for each month, on which editing of the forecast data is frozen. However, the present disclosure is not limited to this example embodiment and any time period may configured as a freeze period.

FIG. 12 shows an "Approval Process Setup" page 1200 of a user interface according to an example embodiment wherein a "Freeze Month" configuration has been added. As shown in FIG. 12, a due date for the forecast for each month has been selected for the Financial Year 2022. That is, according to the example embodiment shown in FIG. 12, the respective due dates for each freeze period for each month has been configured with the specific dates shown in FIG. 12. For instance, as shown in FIG. 12, from Jan. 31, 2022, onwards, a user will not be able to edit any forecast data for the month of January, 2022. However, before Jan. 31, 2022, the user may edit the forecast data for the month of January, 2022. Similarly, as shown in FIG. 12, from Feb. 28, 2022, onwards, a user will not be able to edit any forecast data for the month of February, 2022.

FIG. 13 shows an "Approval Process Setup" page 1300 of a user interface according to an example embodiment wherein a Delete button 1310 for the "Freeze Month" configuration has been highlighted.

Figure 14:
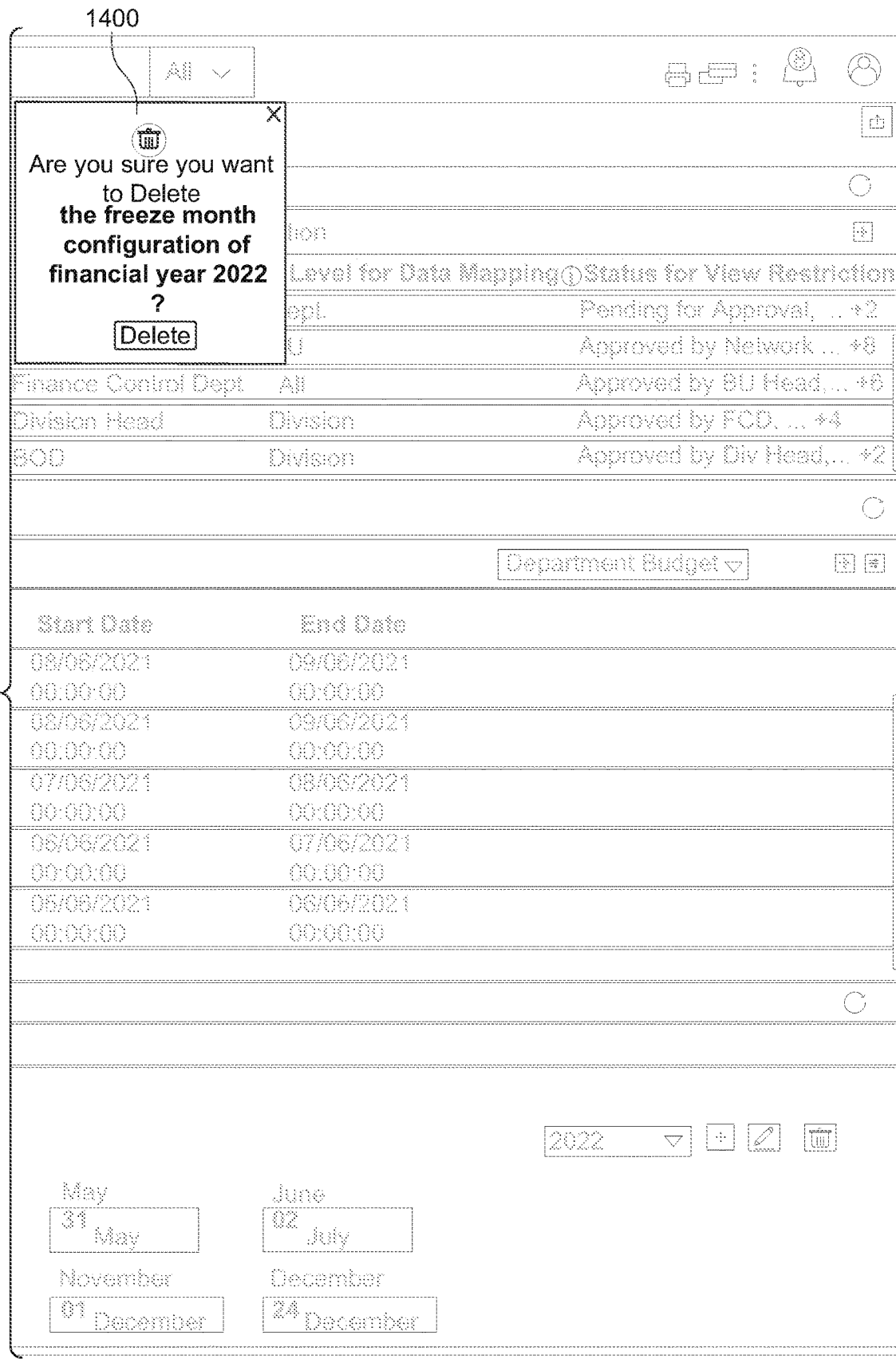
FIG. 14 shows a confirmation window for deleting a "Freeze Month" configuration according to an example embodiment.

FIG. 14 shows a confirmation window 1400 for deleting a "Freeze Month" configuration according to an example embodiment. The confirmation window may be shown after a user has selected the Delete button for the "Freeze Month" configuration to confirm that the user is sure the user wants to delete the "Freeze Month" configuration.

According to an example embodiment of the present disclosure, a user may configure a submission period within which a user may edit and submit forecast data. Also, if a user does not submit forecast data within a particular configured submission period, then forecast data may be auto-submitted. In addition to the configured submission period, a user may also configure a freeze period to freeze the submitted forecast data so that the submitted forecast data cannot be edited. Thus, financial forecasting may be carried out in a more systematic and efficient manner and a user has the freedom to configure an on-the-fly system, with pre-defined configured rules for data submission management. Moreover, according to an example embodiment, submitted financial forecasting data may be compared to the approved budget in a timely manner (e.g., on a real-time basis)

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus for configuring submission of financial forecasting data, the apparatus comprising:

a memory storing instructions;
a processor configured to execute the stored instructions to:
configure a user interface to at least one of receive and transmit information-;
receive a first user input through the user interface, wherein the first user input is associated with one or more freeze times, wherein the one or more freeze times indicate a time after which submission by at least one first user of financial forecasting data and modification by the at least one first user of submitted financial forecasting data before the one or more freeze times are restricted;
receive through the user interface a second user input associated with a configuration of at least one submission period configured at a time before the one or more freeze times, and wherein the at least one submission period is a period during which submission and modification of financial forecasting data by the at least one first user is enabled, while post expiration of the at least one submission period submission and modification of financial forecasting data are restricted for the at least one first user;
determine whether financial forecasting data is submitted by the at least one first user during one of the at least one submission period;
based on determining that the financial forecasting data is not submitted by the at least one first user during the one of the at least one submission period, automatically submit the financial forecasting data;
after a freeze time of the at least one freeze times, restrict submission and modification of the submitted financial forecasting data for a period prior to the freeze time; and
generate, based on the submitted financial forecasting data, a financial forecast.

2. The apparatus of claim 1, wherein the processor is configured to generate the financial forecast by comparing the submitted financial forecasting data to a previously approved budget.

3. The apparatus of claim 1, wherein each of the one or more freeze times is associated with each one of a plurality of months, and
wherein the each of the at least one submission period is configured to occur before the respective freeze time of the one or more freeze times in each one of the plurality of months.

4. The apparatus of claim 1, wherein the processor is further configured to automatically submit the financial forecasting data by:
determining a most recent financial forecasting data; and
submitting the determined most recent financial forecasting data to a second user.

5. The apparatus of claim 1, wherein the at least one submission period comprises at least one submission period for each week that will occur before the one or more freeze times.

6. The apparatus of claim 1, wherein the processor is further configured to:
receive, from a second user, an approval of the submitted financial forecasting data; and
generate, based on the approved financial forecasting data, the financial forecast.

7. The apparatus of claim 1, wherein the processor is further configured to:

display a reminder to submit financial forecasting data before a current one of the at least one submission period ends.

8. A method for configuring submission of financial forecasting data, the method comprising:
   configuring, by a processor, a user interface to at least one of receive and transmit information;
   receiving, by the processor, a first user input from a first user through the user interface, wherein the first user input is associated with one or more freeze times, wherein the one or more freeze times indicate a time after which submission by at least one first user of financial forecasting data and modification by the at least one first user of submitted financial forecasting data before the one or more freeze times are restricted;
   receiving, by the processor through the user interface, a second user input associated with a configuration of at least one submission period configured at a time before the one or more freeze times, and wherein the at least one submission period is a period during which submission and modification of financial forecasting data by the at least one first user is enabled, while post expiration of the at least one submission period submission and modification of financial forecasting data are restricted for the at least one first user;
   determining whether financial forecasting data is submitted by the at least one first user during one of the at least one submission period;
   based on determining that the financial forecasting data is not submitted by the at least one first user during the one of the at least one submission period, automatically submitting the financial forecasting data;
   after a freeze time of the at least one freeze times, restricting submission and modification of the submitted financial forecasting data for a period prior to the freeze time; and
   generating, by the processor based on the submitted financial forecasting data, a financial forecast.

9. The method of claim 8, wherein the generating the financial forecast comprises comparing the submitted financial forecasting data to a previously approved budget.

10. The method of claim 8, wherein each of the one or more freeze times is associated with one of a plurality of months, and wherein the each of the at least one submission period is configured to occur before the respective freeze time of the one or more freeze times in each one of the plurality of months.

11. The method of claim 8, wherein the automatically submitting comprises:
   determining, by the processor, a most recent financial forecasting data; and
   submitting, by the processor, the determined most recent financial forecasting data to a second user.

12. The method of claim 8, wherein the at least one submission period comprises at least one submission period for each week that will occur before the one or more freeze times.

13. The method of claim 8, wherein the method further comprises:
   receiving, by the processor from a second user, an approval of the received submitted financial forecasting data; and
   generating, by the processor based on the approved financial forecasting data, the financial forecast.

14. The method of claim 8, wherein the method further comprises:
   displaying, by the processor via the user interface, a reminder to submit financial forecasting data before a current one of the at least one submission period ends.

15. A non-transitory computer readable storage medium storing instructions which, if executed, cause a processor to implement operations for configuring submission of financial forecasting data, the operations comprising:
   configuring, by the processor, a user interface to at least one of receive and transmit information;
   receiving, by the processor, a first user input through the user interface, wherein the first user input is associated with one or more freeze times, wherein the one or more freeze times indicate a time after which submission by at least one first user of-financial forecasting data and modification by the at least one of first user of submitted financial forecasting data before the one or more freeze times are restricted;
   receiving, by the processor through the user interface, a second user input associated with a configuration of at least one submission period configured at a time before the one or more freeze times, and wherein the at least one submission period is a period during which submission and modification of financial forecasting data by the at least one first user is enabled, while post expiration of the at least one submission period submission and modification of financial forecasting data are restricted for the at least one first user;
   determining, by the processor, whether financial forecasting data is submitted by the at least one first user during one of the at least one submission period;
   based on determining that the financial forecasting data is not submitted by the at least one first user during the one of the at least one submission period, automatically submitting, by the processor, the financial forecasting data;
   after a freeze time of the at least one freeze times, restricting, by the processor, submission and modification of the submitted financial forecasting data for a period prior to the freeze time; and
   generating, by the processor based on the submitted financial forecasting data, a financial forecast.

16. The non-transitory computer readable storage medium of claim 15, wherein the generating the financial forecast comprises comparing the submitted financial forecasting data to a previously approved budget.

17. The non-transitory computer readable storage medium of claim 15, wherein each of the one or more freeze times is associated with one of a plurality of months, and wherein the at least one submission period is configured to occur before the respective freeze time of the one or more freeze times in each one of the plurality of months.

18. The non-transitory computer readable storage medium of claim 15, wherein the automatically submitting comprises:
   determining, by the processor, a most recent financial forecasting data; and
   submitting, by the processor, the determined most recent financial forecasting data to a second user.

19. The non-transitory computer readable storage medium of claim 15, wherein the at least one submission period comprises at least one submission period for each week that will occur before the one or more freeze times.

20. The non-transitory computer readable storage medium of claim 15, wherein the operations further comprise:
   receiving, by the processor from a second user, an approval of the submitted financial forecasting data; and generating, by the processor based on the approved financial forecasting data, the financial forecast.

* * * * *